United States Patent [19]

Chenot

[11] 4,266,160
[45] May 5, 1981

[54] STRONTIUM-CALCIUM FLUORAPATITE PHOSPHORS AND FLUORESCENT LAMP CONTAINING THE SAME

[75] Inventor: Charles F. Chenot, Towanda, Pa.

[73] Assignee: GTE Products Corporation, Stamford, Conn.

[21] Appl. No.: 51,307

[22] Filed: Jun. 22, 1979

[51] Int. Cl.³ .................. C09K 11/44; H01J 61/44
[52] U.S. Cl. .................. 313/486; 252/301.4 P; 252/301.6 P
[58] Field of Search ............ 252/301.4 P, 301.6 P; 313/486

[56] References Cited

U.S. PATENT DOCUMENTS

| | | | |
|---|---|---|---|
| 2,488,733 | 11/1949 | McKeag et al. | 252/301.4 P |
| 2,965,786 | 12/1960 | Aia et al. | |
| 2,999,070 | 9/1961 | Rimback | 252/301.4 P |
| 3,255,373 | 6/1966 | Broekhoven et al. | 252/301.4 P X |
| 3,513,103 | 5/1970 | Shaffer | 252/301.4 P |
| 3,549,552 | 12/1970 | Broekhoven | 252/301.4 P |
| 3,816,327 | 6/1974 | Vodoklys | 252/301.6 P |
| 4,075,532 | 2/1978 | Piper et al. | 252/301.4 P X |

*Primary Examiner*—Jack Cooper
*Attorney, Agent, or Firm*—Donald R. Castle

[57] ABSTRACT

A fluorescent lamp can incorporate a new strontium-calcium fluorapatite of the formula $$Ca_{5.0-a-w-x-y}Sr_aCd_wMn_xSb_y(PO_4)_3F_{1-y}O_y$$

wherein
a is from about 0.25 to about 4.75-w-x-y
w is from 0 to about 0.2
x is from about 0.05 to about 0.5
y is from about 0.02 to about 0.2

The compositions have unexpected chromaticity properties.

6 Claims, 8 Drawing Figures

STRONTIUM-CALCIUM FLUORAPATITE PHOSPHORS AND FLUORESCENT LAMP CONTAINING THE SAME

BACKGROUND OF THE INVENTION

This invention relates to alkaline earth fluorophosphate luminescent materials. More particularly it relates to strontium-calcium fluorapatite phosphors activated with manganese and antimony and to fluorescent lamp incorporating these phosphor materials.

U.S. Pat. No. 2,488,733 discloses various alkaline earth halophosphate phosphors. The halophosphate host is described by the formula $$3M_3(PO_4)_6M^1L_2$$

where L is a halogen or a mixture of halogens and M and $M^1$ are either different or identical alkaline earth metals. Specific alkaline earth halophosphate materials disclosed are calcium fluorapatite, calcium fluorochlorapatite, calcium chloroapatite, calcium-strontium fluoro-chloroapatite strontium fluorapatite, calcium bromo-chloroapatite, barium fluorapatite, barium fluorochloroapatite and barium chlorapatite. The materials are activated with antimony and manganese. In lieu of antimony, bismuth, tin or lead can be used.

U.S. Pat. No. 2,965,786 discloses that cadmium can be added to halophosphate of the above formula where M and $M^1$ are calcium.

U.S. Pat. No. 3,549,552 discloses calcium fluorochloroapatite materials which are useful in the production of lamps exhibiting a "daylight" color. "Daylight" is a color defined by an oval that has x values ranging from about 0.307 to about 0.319 and y values ranging from about 0.330 to about 0.345. As defined in the American National Standard Specifications for the Chromaticity of Fluorescent Lamps the objective for daylight is x=0.313, y=0.337.

U.S. Pat No. 4,075,532 discloses the composition defined by the fromula $$Ca_{10-w-x-y}Cd_xSb_y(PO_4)_6F_{2-y}O_y$$

wherein
w is from 0 to 0.2
x is from 0.25 to 0.5
y is from 0.02 to 0.2

The chromaticity of the foregoing composition is stated to vary along a line x in FIG. 3 of the above patent. The variation is due to the manganese content. A material having x in the above formula of about 0.03 is stated to have chromaticity coordinates of x=0.409 and y=0.432. The values given take into account the effect of the mercury emission. Manganese at low levels causes the halophosphates to emit a light blue and at higher levels, eg wherein x in the formula given in U.S. Pat. No. 4,075,532 is about 5% of the total phosphor weight, the emission of the phosphors shifts toward the red portion of the spectrum.

When strontium is substituted for all of the calcium in the fluorapatite system and the levels of manganese and antimony are kept constant the emission is shifted toward the green portion of the spectrum.

It is believed, therefore, that new halophosphate compositions that yield chromaticity values that were unexpected from the prior art constitutes an advancement in the art.

SUMMARY OF THE INVENTION

New strontium calcium fluorapatite phosphors having the formula $$Ca_{5.0-a-w-x-y}Sr_aCd_wMn_xSb_y(PO_4)_3F_{1-y}O_y$$

wherein
a is from about 0.25 to about 4.75−w−x−y
w is from 0 to about 0.2
x is from about 0.05 to about 0.5
y is from about 0.02 to about 0.2
have chromaticity values that vary significantly from the chromaticity values that would be predicted from the calcium fluorapatite or the strontium fluorapatite.

DESCRIPTION OF THE PREFERRED EMBODIMENTS

For a better understanding of the present invention, together with other and further objects, advantages and capabilities thereof, reference is made to the following disclosure and appended claims in connection with the above-described drawings.

EXAMPLE I

Samples of various manganese and antimony activated calcium fluorapatite, calcium-strontium fluorapatite and strontium fluorapatite are prepared following the general procedure given in U.S. Pat No. 2,965,786. For the manganese-antimony activated calcium fluorapatite the following raw materials are used:

| | |
|---|---|
| CaHPO₄ | 3.00 moles |
| CaF₂ | .485 moles |
| Sb₂O₃ | 0.15 moles |
| CaCO₃ | 1.325 moles |
| MnCO₃ | 0.15 moles |
| CdO | .025 moles |

For those samples where strontium is substituted for a portion or all of the calcium the substitution can be made by substituting $SrHPO_4$, $SrF_2$ or $SrCO_3$ for the appropriate amount of $CaHPO_4$, $CaF_2$ or $CaCO_3$. Thus phosphor composition of the following formula are prepared:

$$Ca_{4.795-a}Sr_aCd_{0.025}Mn_{0.15}Sb_{0.03}[PO_4]_3F_{0.97}O_{0.03}$$

The following Table I gives the chromaticity coordinates, the peak emission and the 50% bandwidth for a number of materials in which a in the foregoing formula is varied.

TABLE I

| Value of a | Peak (Nanometers) | 50% Bandwidth Nanometers | Chromaticity Coordinates x | y |
|---|---|---|---|---|
| 0 | 573.4 | 74.1 | 0.436 | 0.465 |
| 1.0 | 577.9 | 77.8 | 0.457 | 0.464 |
| 2.0 | 577.5 | 80.4 | 0.460 | 0.467 |
| 3.0 | 573.8 | 82.3 | 0.450 | 0.474 |
| 4.0 | 569.9 | 84.0 | 0.440 | 0.485 |
| 4.795 | 564.7 | 84.2 | 0.423 | 0.490 |

Figure 2:
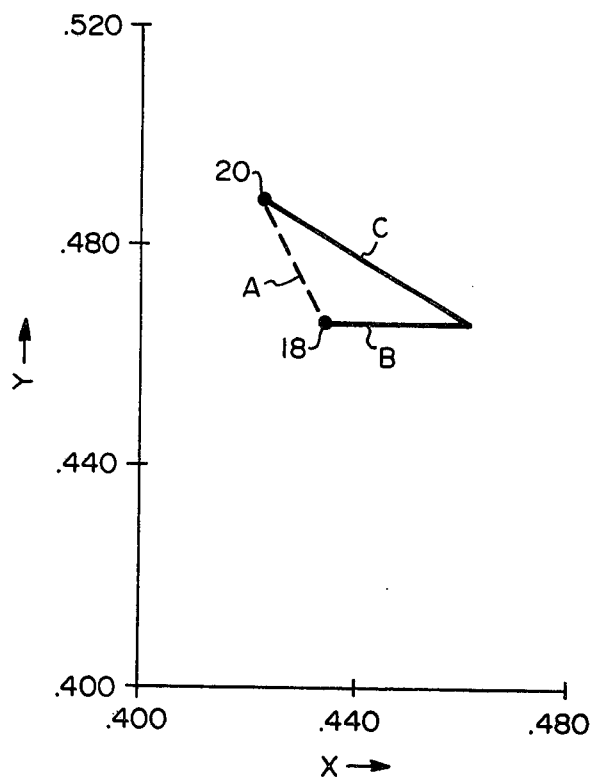
FIG. 2 is a portion of the CIE diagram containing information useful in understanding the present invention.
Figure 4:
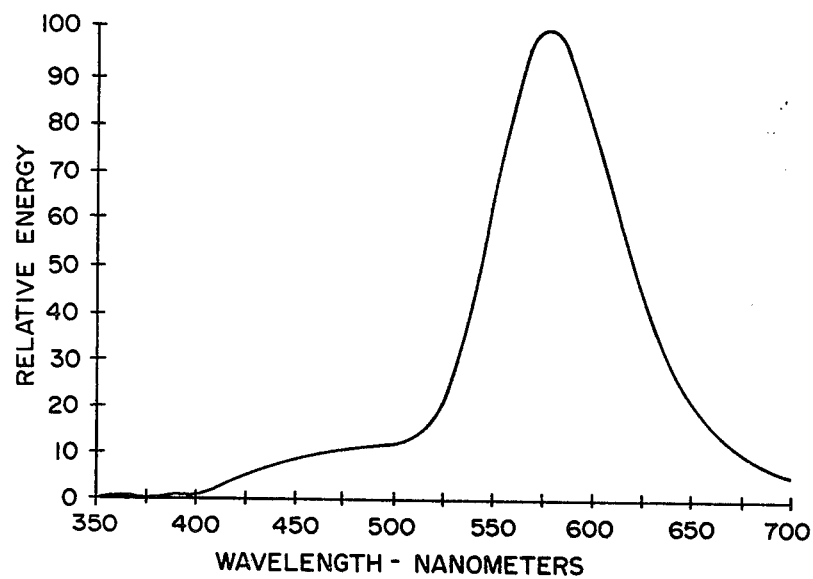
Figure 5:
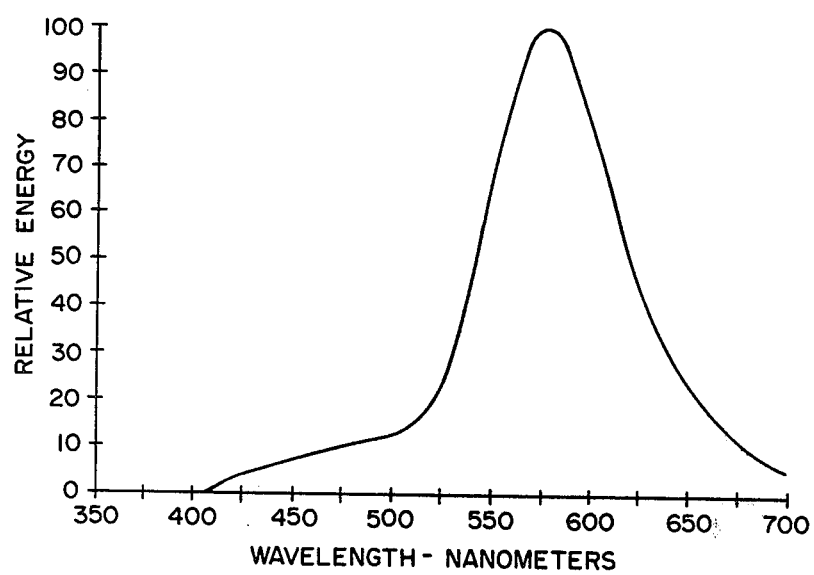
Figure 6:
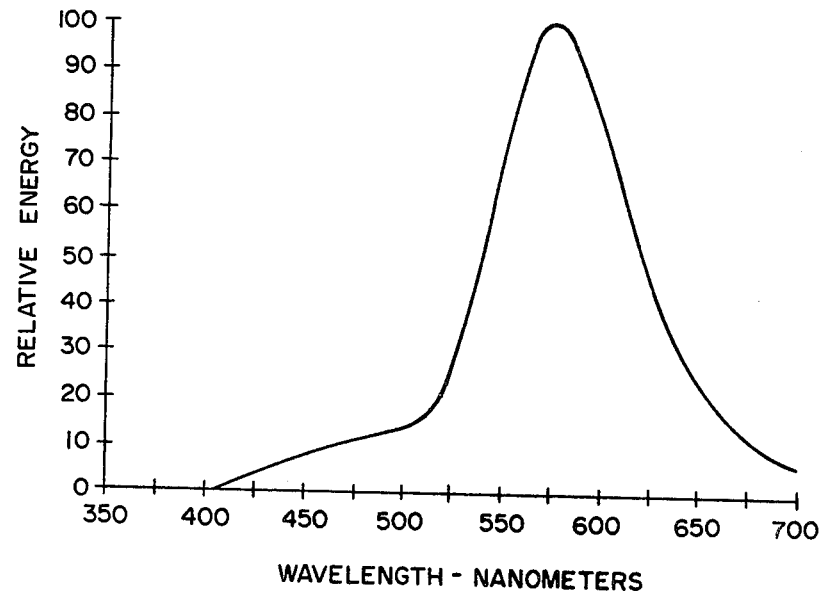
Figure 7:
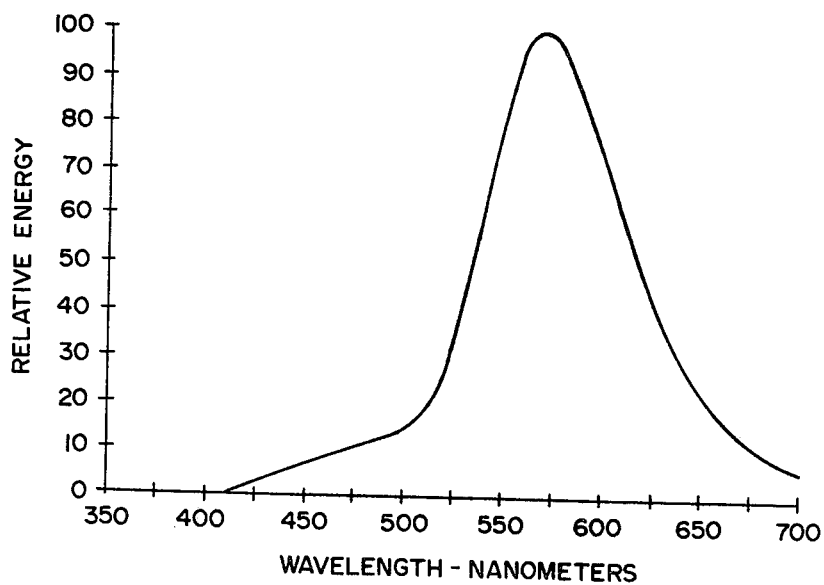

The chromaticity coordinates of these compositions are plotted in FIG. 2 and the spectral energy distribution of these compositions under 254 nanometer excitation are plotted in FIGS. 3 through 8. As can be seen from FIG. 2 the chromaticity shifts to higher "x" values until "a" is equal to about 2.0 which corresponds to about a 40% replacement of the cation content with strontium. The "y" values remain relatively constant. As the value of "a" is increased from about 2.0 to about 4.795, the "x" value decreases and the "y" increases from the 40% substitution material.

Figure 3:
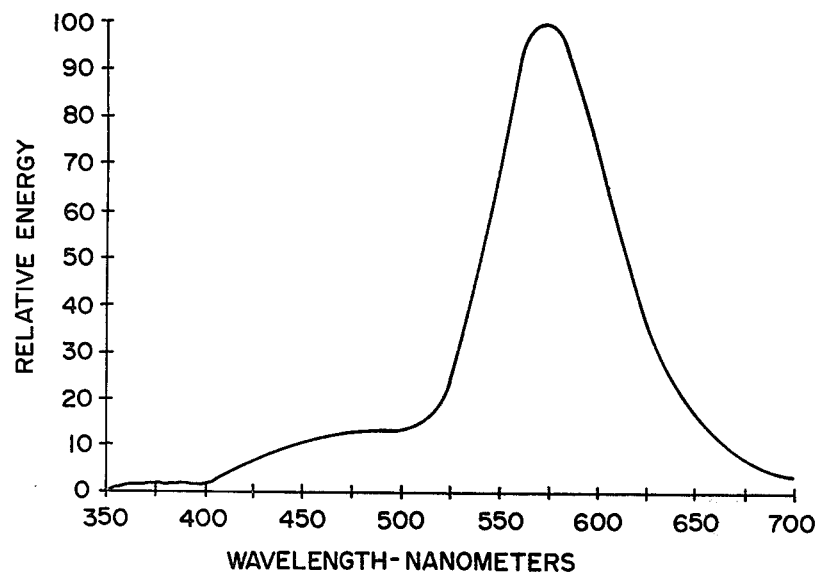
FIG. 3 through 8 are the spectral energy distribution curves for a number of manganese-antimony activated calcium-strontium fluorapatite materials.
Figure 8:
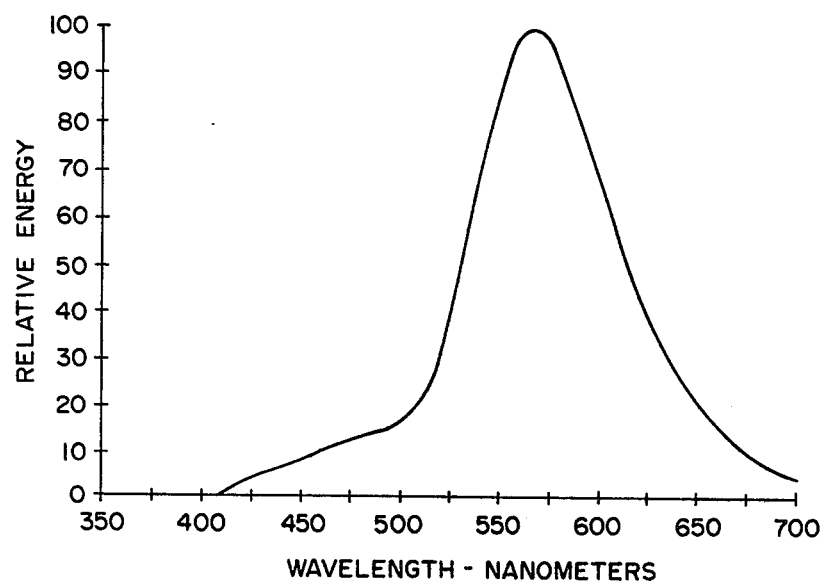

With particular reference to FIGS. 3 through 8, the spectral energy distribution is shown for the samples reported in Table I. FIG. 3 is the material having a value of "a" equal to zero. FIGS. 4-7 are for the materials having "a" values of 1 to 4 respectively while FIG. 8 is for the material having no calcium in which "a" is equal to 4.795. FIGS. 3 through 8 show that samples that have "a" values of 1.0 and 2.0 have peak wave length at higher wavelengths calcium fluorapatite while at about an "a" value of about 3.0 the peak is about the same wavelength as calcium fluorapatite. At "a" values of 4.00 and 4.795, the peak emission was lower wave length values than calcium fluorapatite. From the peak wavelength data for calcium fluorapatite and strontium fluorapatite, which are phosphors that have been previously disclosed, it would have been expected that all of the peak emissions would have been in the range of about 565 to about 573 nanometers.

With particular reference to FIG. 2, a composition of the formula

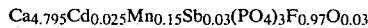

$Ca_{4.795}Cd_{0.025}Mn_{0.15}Sb_{0.03}(PO_4)_3F_{0.97}O_{0.03}$ has been found to have chromaticity coordinates of x=0.436 and y=0.465 and is depicted in FIG. 2 by point 18. A similar phosphor with essentially the same composition except that strontium is substituted for calcium has chromaticity coordinates of x=0.423 and y=0.490 and is plotted as point 20 in FIG. 2. It was expected that composition containing both calcium and strontium would have chromaticity coordinates falling along line A in FIG. 2.

Figure 1:
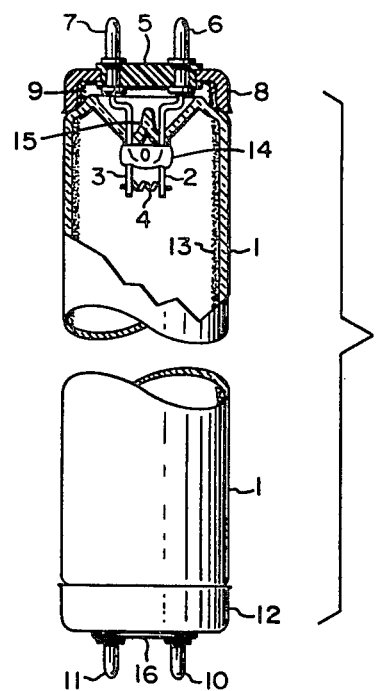
FIG. 1 is a fluorescent lamp employing the phosphor of the present invention.

It has been found that as up to about 40% of the cation ions are replaced by strontium that the chromaticity of the resulting compositions fall along line B in FIG. 1. When from about 40 to 100% of the cations are replaced by strontium, the chromaticity of the resulting compositions fall along line C in FIG. 1. While the above data is for a constant manganese content of 0.15 in the above formula, the same effect is noted with compositions having higher or lower levels of manganese except that compositions containing lower levels of manganese are more blue and those containing higher levels are more yellow.

With particular reference to FIG. 1, the sealed glass envelope 1 has the lead-in wires 2, 3, sealed through one of its ends and corresponding lead-in wires sealed through the other end. The usual coiled-coil 4 of tungsten wire is supported between, and electrically connected to, the pair of lead-in wires 2, 3, and a similar coil is supported by and connected to the lead-in wires at the other end of the envelope 1. An insulating base piece 5 having contact pins 6 and 7, each pin being connected to one of the lead-in wires, held in the metal cap 8, which is fixed by the cement 9 to one end of the envelope 1, and a similar base piece 16, having contact pins 10 and 11, is cemented to the other end by cup 12.

The tungsten coils carry the usual electron-emitting coating of alkaline earth oxides, generally including also a small percentage of zirconium dioxide.

A filling of inert gas such as argon, neon, krypton, and mixtures thereof, at about 2 millimeters of mercury pressure, and the usual small quantity of mercury is inside the glass envelope 1. The lamp has the usual stem press 14 and sealed exhaust tube 15.

The phosphor compositions of the present invention can be used alone or in conjunction with other phosphor materials. If a fluorescent lamp is desired which is the color that would be achieved with the phosphor composition of this invention alone, one skilled in the art can determine the color of emission from FIG. 2 taking into account the emission of mercury. Similarly if used in conjunction with other materials the resulting chromaticity of the lamp can be determined from FIG. 2, the mercury lines, and the chromaticity of the materials with which it is desired to combine with the phosphors of this invention.

EXAMPLE 2

Energy saving 35 watt fluorescent lamps are prepared from the materials reported in Table I and the brightness is measured initially and after 100 hours of operations. These data are given in Table II below.

TABLE II

| Value a | Brightness (lumens) Initial | 100 Hours |
|---|---|---|
| 0 | 3220 | |
| 1.0 | 2939 | |
| 2.0 | 2748 | |
| 3.0 | 2844 | |
| 4.0 | 2618 | |
| 4.795 | 2744 | |

Analytical results indicate that the lower brightness for the materials containing strontium may be due to a decrease in the retained antimony in the composition. To obtain a comparable level of antimony it is necessary to increase the initial amount of antimony oxide approximately by a factor of two when pure strontium fluorapatite is produced. When antimony is at comparable level with the strontium containing material the brightness is at a comparable level to that achieved with the calcium fluorapatite.

While there has been shown and described what are at present considered the preferred embodiments of the invention, it will be obvious to those skilled in the art that various changes and modifications may be made therein without departing from the scope of the invention as defined by the appended claims.

What is claimed is:

1. A luminescent composition consisting essentially of manganese and antimony activated strontium-calcium mixed cation fluorapatite compositions having the formula $$Ca_{5.0-a-w-x-y}Sr_aCd_wMn_xSb_y(PO_4)_3F_{1-y}O_y$$

wherein
  a is from about 0.25 to about $4.75 - w - x - y$
  w is from 0 to about 0.2
  x is from about 0.05 to about 0.5
  y is from about 0.02 to about 0.2

2. A composition according to claim 1 wherein the value of a is from about 1 to about 4.

3. A composition according to claim 1 wherein the value of a is from about 1 to about 2.

4. A composition according to claim 1 wherein the value of a is from about 2 to about 4.

5. A fluorescent lamp comprising a light-transmitting envelope having electrodes, an inert ionizable gas and a charge of mercury therein and a coating of phosphor on the inside surfaces of said envelopes, said phosphor comprising manganese and antimony activated strontium-calcium mixed cation fluorapatite compositions having the formula, $$Ca_{5.0-a-w-x-y}Sr_aCd_wMn_xSb_y(PO_4)_3F_{1-y}O_y$$

wherein
  a is from about 0.25 to about $4.75 - w - x - y$
  w is from about 0 to about 0.2
  x is from about 0.05 to about 0.5
  y is from about 0.02 to about 0.2

6. A lamp according to claim 5 wherein in said formula the value of a is from about 1 to about 4.

* * * * *